United States Patent [19]
Kay et al.

[11] Patent Number: 5,369,888
[45] Date of Patent: Dec. 6, 1994

[54] WIDE FIELD OF VIEW REFLEX GUNSIGHT

[76] Inventors: Ira M. Kay, Elway Hall, Rte. 2 - Box 70, Warrenton, Va. 22186-9802; Clifford E. McLain, 7816 Manor House Dr., Fairfax Station, Va. 22039

[21] Appl. No.: 34,839

[22] Filed: Mar. 19, 1993

Related U.S. Application Data

[63] Continuation-in-part of Ser. No. 3,703, Jan. 13, 1993, abandoned.

[51] Int. Cl.⁵ .................................................. F41G 1/32
[52] U.S. Cl. ......................................... 33/241; 33/246; 356/252
[58] Field of Search ................... 33/241, 246; 356/251, 356/252; 42/100, 101, 103; 359/428, 433

[56] References Cited

U.S. PATENT DOCUMENTS

| | | |
|---|---|---|
| 1,265,266 | 5/1918 | Simpson . |
| 2,030,312 | 2/1936 | Mossberg . |
| 2,596,522 | 5/1952 | Bethke ............... 33/241 |
| 2,633,051 | 3/1953 | Davis . |
| 2,780,130 | 2/1957 | Mauer . |
| 2,949,808 | 8/1960 | Thurow . |
| 3,536,378 | 10/1970 | Bishop . |
| 3,565,539 | 2/1971 | Russa ............... 356/251 |
| 3,633,988 | 11/1972 | Farrar . |
| 3,737,212 | 6/1973 | Antonson et al. . |
| 3,816,005 | 6/1974 | Kirschner ............ 356/251 |
| 3,833,300 | 9/1974 | Rymes . |
| 3,833,799 | 9/1974 | Audet . |
| 3,911,598 | 10/1975 | Mohon . |
| 3,942,901 | 3/1976 | Ekstrano ............ 356/252 |
| 3,963,356 | 6/1976 | Wiklund ............. 33/241 |
| 4,012,150 | 3/1977 | Upatnieks . |
| 4,255,032 | 3/1981 | Matsumoto et al. . |
| 4,266,873 | 5/1981 | Hacskaylo et al. . |
| 4,346,995 | 8/1982 | Morris ............... 356/251 |
| 4,402,605 | 9/1983 | Ekstrand ............. 356/252 |
| 4,658,139 | 4/1987 | Brennan et al. . |
| 4,665,622 | 5/1987 | Idan ................. 33/241 |
| 4,713,889 | 12/1987 | Santiago ............. 33/241 |
| 4,738,044 | 4/1988 | Osterhout . |
| 4,764,011 | 8/1988 | Goldstein ............ 33/241 |
| 4,859,058 | 8/1989 | Ekstrand ............. 33/241 |
| 4,945,667 | 8/1990 | Roualski et al. ...... 33/241 |
| 5,052,801 | 10/1991 | Downes, Jr. et al. . |
| 5,090,805 | 2/1992 | Stawarz ............. 356/251 |
| 5,155,915 | 10/1992 | Repa . |
| 5,205,044 | 4/1993 | DePaoli ............. 33/241 |
| 5,272,514 | 12/1993 | Dor ................. 356/251 |

FOREIGN PATENT DOCUMENTS 8002069  2/1980  WIPO .

*Primary Examiner*—Thomas B. Will
*Attorney, Agent, or Firm*—Shlesinger Arkwright & Garvey

[57] ABSTRACT

A gunsight comprises a unitary frame for securing to a gun. The frame has a ring with a lens at its front end. A light source is secured to the frame rear end to project a light spot onto the lens. The lens and the light source may be independently adjustable in the vertical and horizontal planes, respectively. Alternatively, where the light source is fixed, the lens may be adjusted in the vertical and horizontal planes. The light source and the lens are positioned relative to each other and to the gun barrel axis such that the light spot projected onto the lens is reflected to a shooter's eye who then lines up the light spot onto a target to take aim.

34 Claims, 5 Drawing Sheets

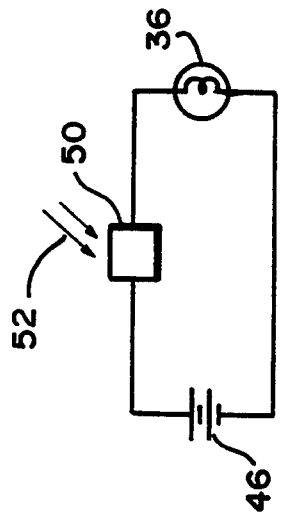
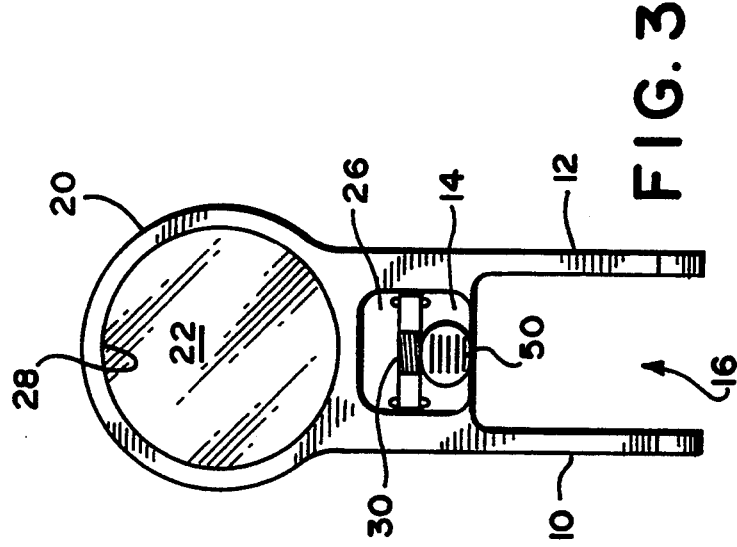
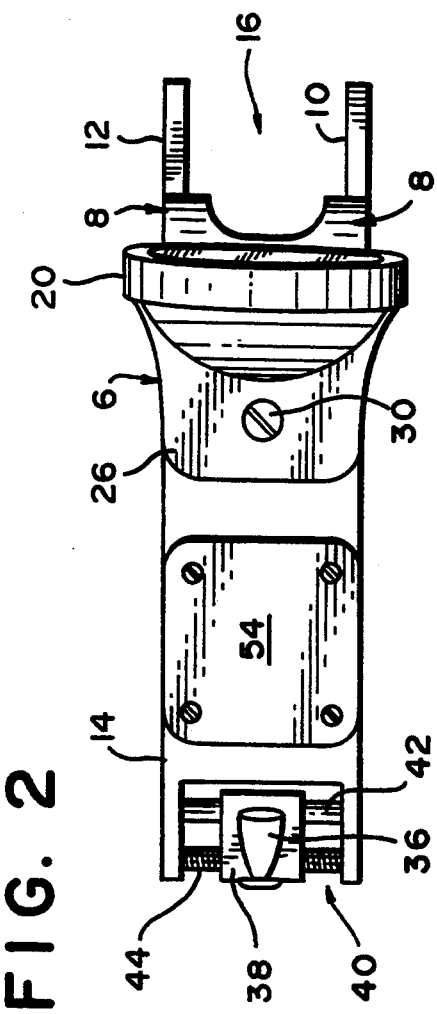
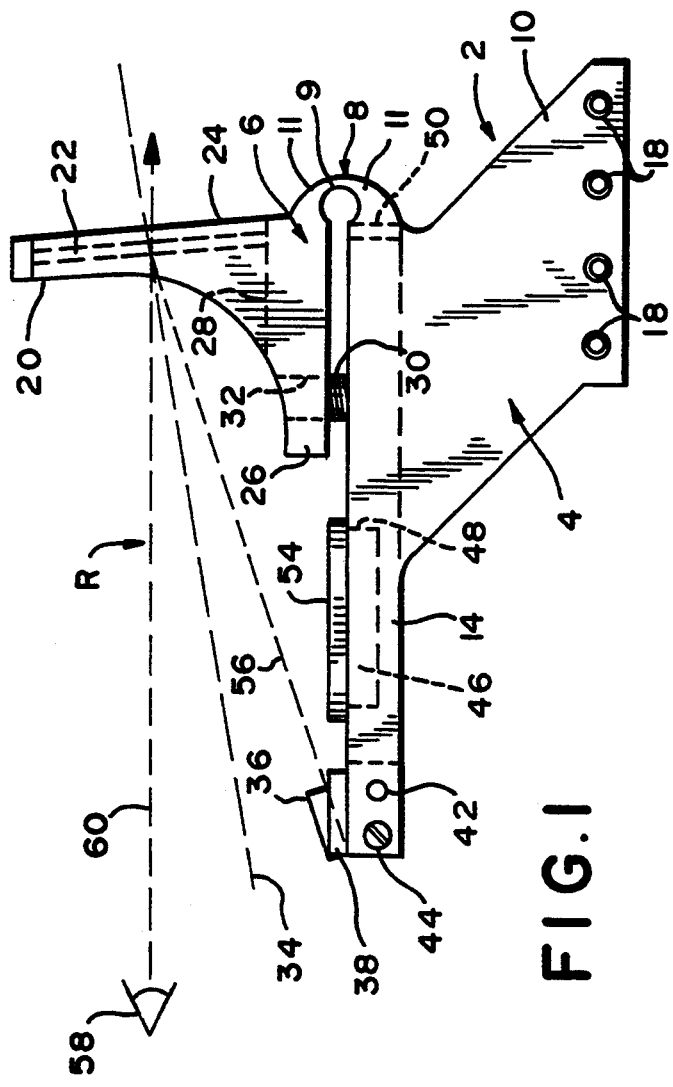

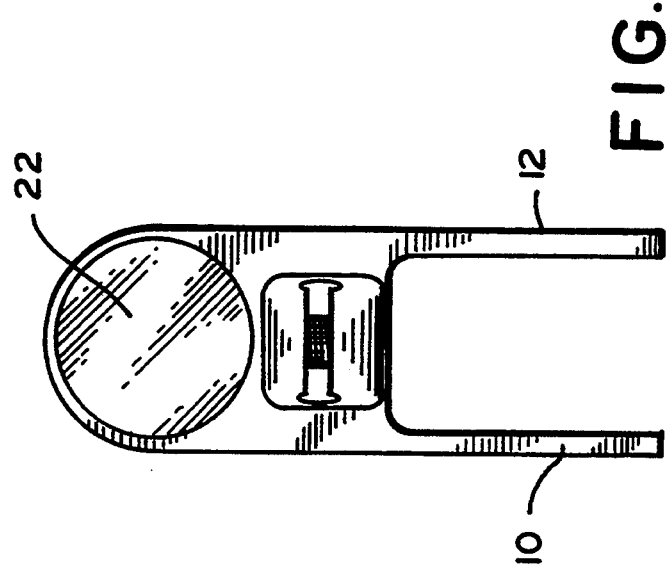
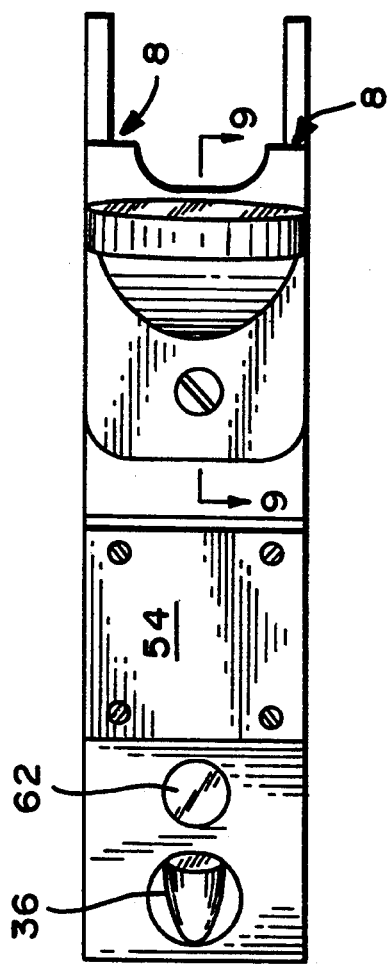
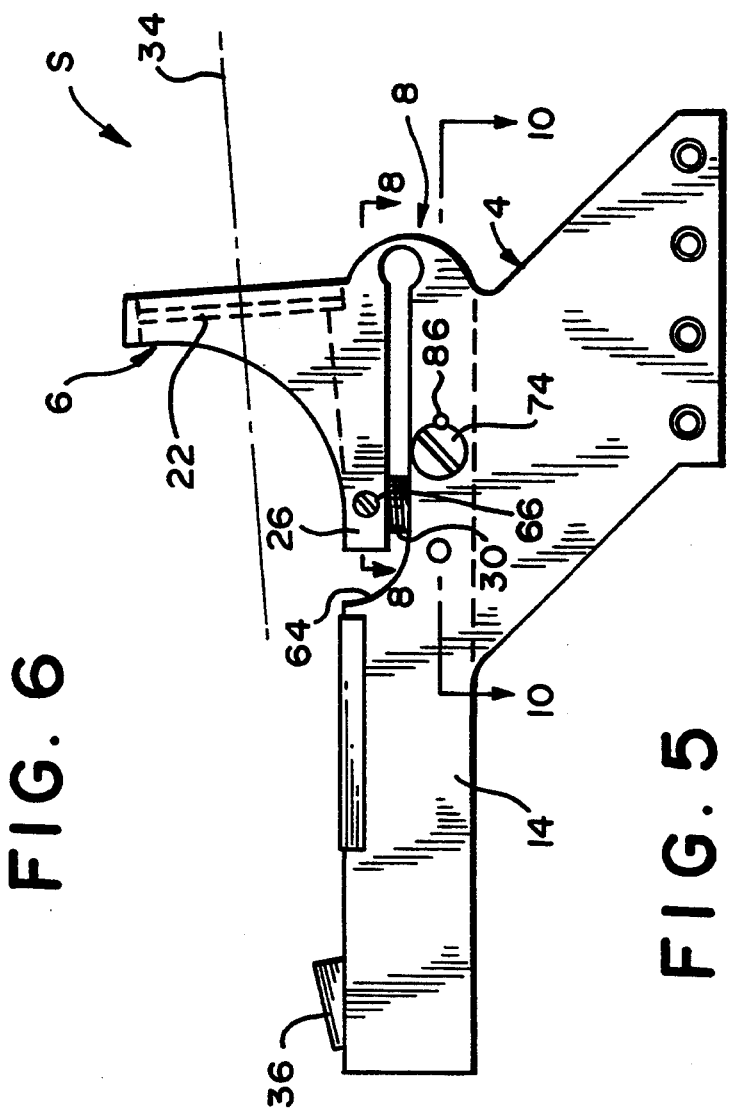

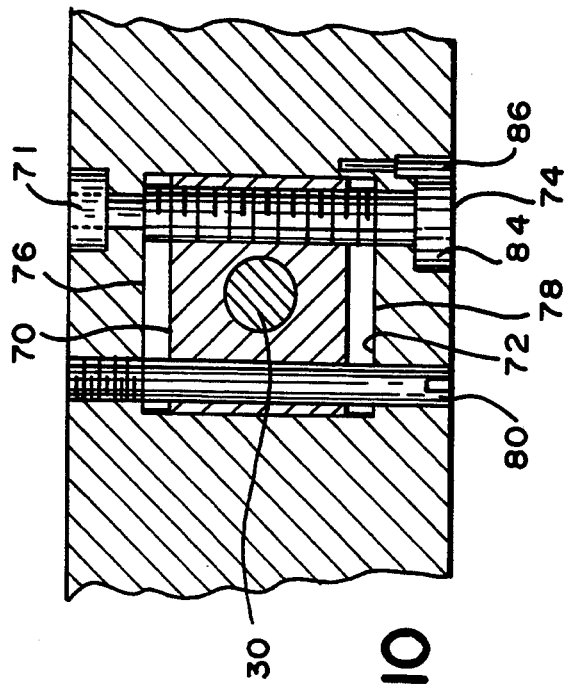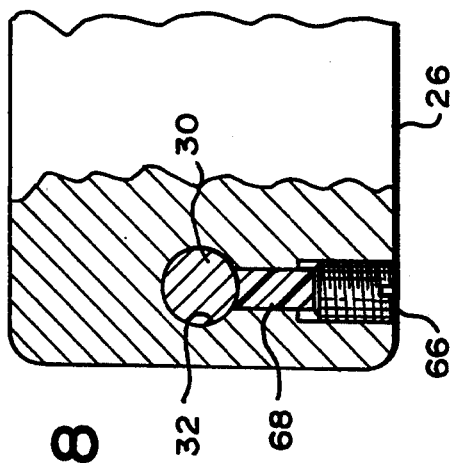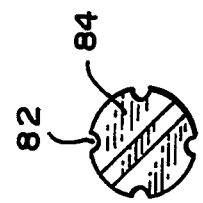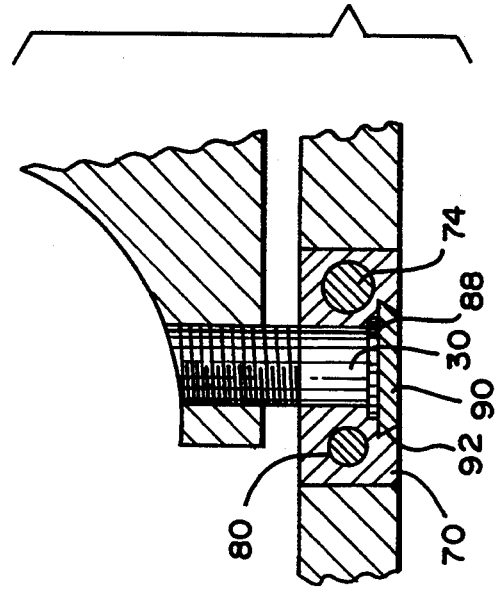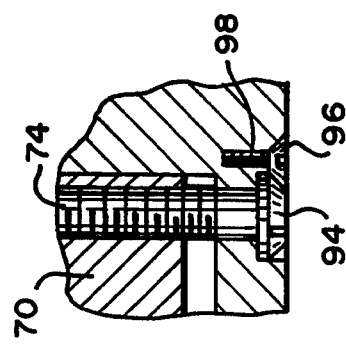

WIDE FIELD OF VIEW REFLEX GUNSIGHT

RELATED APPLICATIONS

This is a continuation-in-part application of application Ser. No. 08/003,703, filed Jan. 13, 1993, now abandoned.

FIELD OF THE INVENTION

The present invention relates generally to a gunsight and specifically to a reflex type gunsight having a wide field of view.

BACKGROUND OF THE INVENTION

Reflex gunsights primarily use telescope like tubes to enclose the optical elements. They project a bright spot of light against a window and the gun is sighted by placing the spot on the target as seen through the window. They are typically heavy and somewhat cumbersome to use and have relatively restricted fields of view.

The present invention solves the above problems and provides other advantages as will be discussed below.

OBJECTS AND SUMMARY OF THE INVENTION

It is therefore an object of the present invention to provide a reflex gunsight that has a wide field of view and relatively light weight.

It is another object of the present invention to provide a reflex gunsight that is relatively rugged and inexpensive to manufacture.

It is still another object of the present invention to provide a reflex gunsight that provides independent adjustments for height and windage.

It is yet another object of the present invention to provide a reflex gunsight that has a variable intensity light spot dependent on the intensity of the ambient light.

It is still further another object of the present invention to provide a reflex gunsight that has a unitary body construction and relatively minimum parts.

It is another object of the present invention to provide a reflex gunsight that has modular electrical components for ease of manufacture.

It is still another object of the present invention to provide a reflex gunsight that will fit a relatively wide range of firearms.

It is yet another object of the present invention to provide a reflex gunsight of compact design for relative ease of use with a holster.

In summary, the present invention provides a reflex gunsight that provides a wide field of view and is relatively rugged and inexpensive to manufacture.

These and other objects of the present invention will become apparent from the following detailed description.

BRIEF DESCRIPTION OF THE DRAWINGS

FIG. 1 is a side elevational view of a gunsight in accordance with the present invention.

FIG. 2 is a top plan view of FIG. 1.

FIG. 3 is a front elevational view of FIG. 1.

FIG. 4 is a schematic diagram of the electrical components used in the present invention.

FIG. 5 is a side elevational view of another embodiment of a gunsight in accordance with the present invention.

FIG. 6 is a top plan view of FIG. 5.

FIG. 7 is a front elevational view of FIG. 5.

FIG. 8 is an enlarged fragmentary top cross-sectional view taken along line 8—8 of FIG. 5, showing a locking mechanism for the height adjustment screw.

FIG. 9 is an enlarged fragmentary side cross-sectional view taken along line 9—9 in FIG. 6, showing the windage block assembly used in the present invention.

FIG. 10 is an enlarged top cross-sectional view taken along lines 10—10 in FIG. 5, showing the windage block assembly used in the present invention.

FIG. 11 is an enlarged top view of a windage screw used in the present invention.

FIG. 12 is an enlarged fragmentary cross-section of another embodiment of a windage screw used in the present invention.

DETAILED DESCRIPTION OF THE INVENTION

Figure 13:
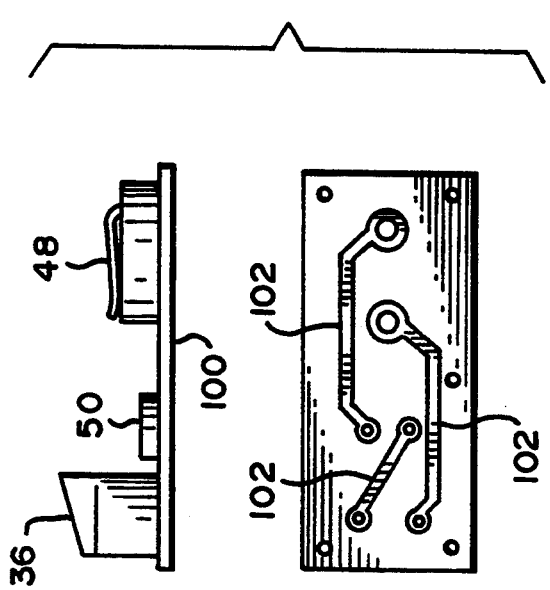
FIG. 13 shows bottom and side elevational views of the electrical components used in the present invention.

A gunsight R in accordance with the present invention is disclosed in FIG. 1. The gun sight R is made of a unitary body or frame 2 having a lower arm 4 and an upper arm 6 that is hingedly connected to the lower arm 4 through an integral hinge portion 8. The hinge portion 8 has a thinner portion 9 intermediate thicker portions 11 to advantageously provide resiliency and flexibility to the hinge portion 8. The body 2 is preferably made from DELRIN or equivalent materials.

The lower arm 4 has opposed leg portions 10 and 12 extending downwardly from a base portion 14, thereby defining a slot 16 for receiving a portion of the gun (see FIG. 19) onto which the gunsight R is secured. Holes 18 disposed on the lower end of the leg portions 10 and 12 are used to secure the gunsight R to the gun.

The upper arm 6 is disposed at the front end of the lower arm 4. The upper arm 6 has a ring portion 20 in which a lens 22 is secured by a locking ring 24. The upper arm 6 has a base or leg portion 26 that is disposed substantially transversely to the ring portion 20, as best shown in FIG. 1.

The ring portion 20 has a through opening 28 within which the lens 22 is secured by conventional means.

A captive screw 30 is secured to the base portion 14 of the lower arm 4 and cooperates with a threaded hole 32 in the base portion 26 of the upper arm 6 to selectively raise or lower the base portion 26 about the hinge portion 8. Thus, turning the screw 30 moves the angular disposition of the optical axis 34 of the lens 22, thereby providing height adjustment along the vertical plane for the gunsight R.

A photodiode assembly 36 is disposed on the rear end of the lower arm 4, as best shown in FIGS. 1 and 2. The photodiode assembly 36 is carried by a windage block or slide 38, which is supported within a slot 40 by a guide rod 42 and a windage adjusting screw 44, as best shown in FIG. 2. The windage block 38 is slidable with respect to the guide rod 42. The adjusting screw 44 cooperates with the windage block 38 such that rotation of the screw 44 along its axis causes the windage block 38 to move within the slot 40 along the axis of the screw 44. The windage adjusting screw 44 provides the gunsight R with azimuth adjustment along the horizontal plane.

A battery 46 is disposed within a battery holder 48 on the base portion 14 of the lower arm 4. A photocell switch 50 is advantageously disposed at the front end of the base portion 14 of the lower arm 4, as best shown in FIGS. 1 and 3. The battery 46, the photocell switch 50 and the photodiode assembly 36 are connected in series, such that when light rays 52 impinge on the photocell 50 the circuit is completed, causing current from the battery 46 to flow through the photodiode assembly 36 to energize it. The photocell switch 50 advantageously has an internal resistance that decreases as the light rays intensity increases, thereby increasing the voltage across the photodiode 36, and increasing its light output. In the absence of light rays 52, as when the gunsight R is placed inside a carrying case, the photocell switch 50 will advantageously be in the open position, thereby conserving battery power. A person of ordinary skill in the art will therefore understand that the operation of the photocel switch 50 is automatic, without requiring any action on the part of the user. This advantageously eliminates inadvertent draining of the battery when one forgets to turn off the circuit switch when replacing the gun in its case.

The battery holder 48 has a cover 54 that is advantageously accessible without dismounting the gunsight R from the gun.

The lens 22 has a surface disposed toward the shooter that is either flat or concave with a reflective coating to enhance the reflection of red light. The concave surface advantageously makes the light spot projected by the photodiode 36 appear larger. The concavity of the lens 22 advantageously minimizes the problem of "ghosting", where the light spot projected onto the lens 22 is reflected at the near surface and also at the further surface of the lens.

If a concave lens is used, it is preferable that the radius of curvature of the concave surface be greater than the distance from the photodiode assembly 36 to the lens 22 by at least 20% to provide a focused light spot.

The surface of the lens 22 towards the shooter is preferably provided with a reflective coating of ½ wavelength for red light.

A tubular hood (not shown) enclosing the upper arm 6 to protect the lens 22 may be used.

The photodiode assembly 36 is preferably a collimated LED red light source, since this type of photodiode generally consumes relatively less electricity.

In operation, the gunsight R is secured to a gun (see FIG. 19) such that the leg portions 10 and 12 straddle a mounting structure or frame of the gun. In daylight, the photocell switch 50 will be in the closed position so that the photodiode assembly 36 is energized by the battery 46. The photodiode 36 projects a light spot on the lens 22 along a path 56 and is reflected to the eye 58 of a shooter along a line of sight 60, which is aligned with a target.

The gunsight R is adjusted for height along the vertical plane by means of the adjusting screw 30 and for azimuth along the horizontal plane by means of the windage screw 44.

Figure 19:
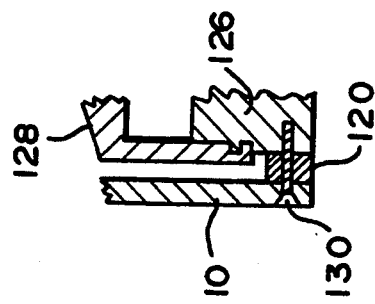
FIG. 19 is a fragmentary cross-sectional view taken through one of the leg portions of the gunsight secured to a gun frame.

The leg portions 10 and 12 are designed to accommodate the slide of an automatic pistol as best shown in FIG. 19. A person of ordinary skill in the art will understand that a different structure may be designed to accommodate a different type of gun.

Because of the open design of the gunsight R, the field of view of the shooter is much wider in comparison with a gunsight utilizing the telescope-like tube design.

Another embodiment of a gunsight S is disclosed in FIGS. 5, 6 and 7. The gunsight S advantageously has an overall single width and compact height for shooters using a holster. The gunsight S has a stationary photodiode assembly 36 controlled by the photocell 50 disposed under a transparent window 62, as best shown in FIG. 6.

The base portion 26 of the upper arm 6 is disposed in a recess 64 in the lower arm 4 to advantageously provide a compact profile for the gunsight S. The captive screw 30 used for elevation adjustments for the lens 22 is locked in place by means of a locking screw 66 pushing a resilient plug 68 against the screw 30, as best shown in FIG. 8. The plug 68 may be made of any suitable material, such as Nylon.

Windage adjustment to the lens 22 is made by means of a windage block or slide 70 that is slidable laterally within a slot 72 disposed in the base portion 14 of the lower arm 4. A windage screw 74 moves the windage block 70 between the walls 76 and 78 of the slot 70, as best shown in FIG. 10. A guide pin 80 disposed through a hole in the windage block 70 and in sliding contact therewith guides the windage block 70 in its lateral movement within the slot 72 when the windage screw 74 is turned. A nut 71 rotatably secures the windage screw 74 in place. A plurality of notches 82 are disposed circumferentially and axially around the head 84 of the windage screw 74 and cooperates with a spring 86 to provide a detente stop for the windage screw adjustment.

The height adjustment screw 30 is carried by the windage block 70, as best shown in FIG. 9. The screw 30 has a flanged head 88 received in a corresponding recess in the windage block 70 and secured in place by a dovetail retainer 90 received in a corresponding dovetail slot 92.

Another method for providing a locking mechanism for the windage screw 74 is disclosed in FIG. 12. The windage screw 74 is provided with a conical head 94 whose periphery is in contact with the complementary conical head 96 of a locking screw 98. When the locking screw 98 is loosened such that the head 96 is moved away from the head 94, the windage screw 74 can then be turned to any desired amount of rotation and then locked in place by tightening the locking screw 98. The complementary conical heads 94 and 96 advantageously provide relatively larger surface contact for positive locking to withstand vibrations encountered during firearm use. This locking mechanism also advantageously provides an infinite number of adjustments for the windage screw 74 within the limits provided by the slot 72.

Figure 14:
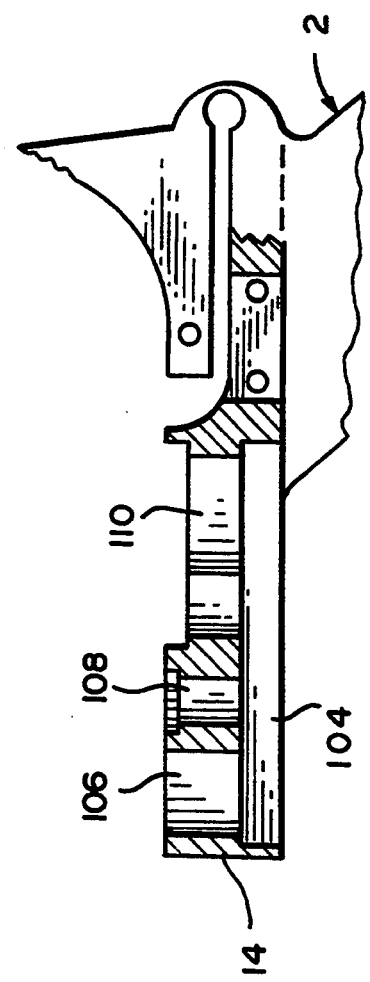
FIG. 14 is a fragmentary side elevational view with portions shown in cross-section, showing various recesses in the gunsight frame to accommodate the electrical components shown in FIG. 13.

The photodiode assembly 36, the photocell 50 and the battery holder 48 are advantageously secured to a circuit board 100, as best shown in FIG. 13. The modular design provides for ease of manufacture. Electrical copper strips 102 on the bottom side of the circuit board 100 interconnect the electrical components in a working circuit as best shown in FIG. 4. The base portion 14 of the lower arm 2 has a cavity 104 that is adapted to receive the circuit board 100 and recesses 106, 108 and 110 adapted to receive the photodiode assembly 36, photocell 50 and the battery holder 48, as best shown in FIG. 14.

Figure 17:
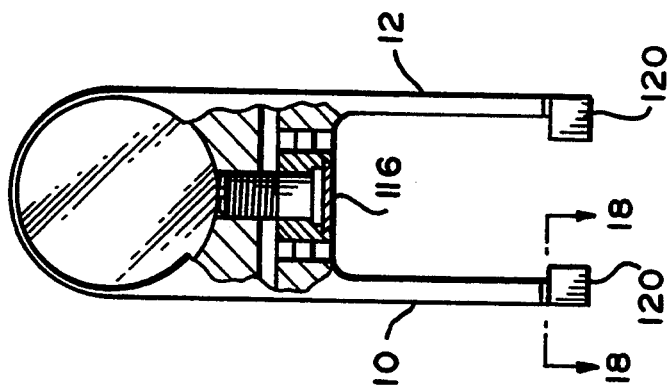
FIG. 17 is a front elevational view of FIG. 16 with portions shown in cross-section.
Figure 15:
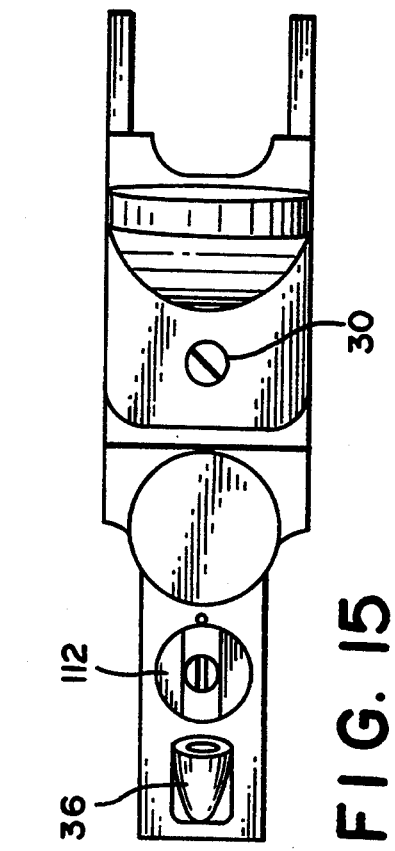
FIG. 15 is a top plan view of another embodiment of a gunsight in accordance with the present invention.
Figure 16:
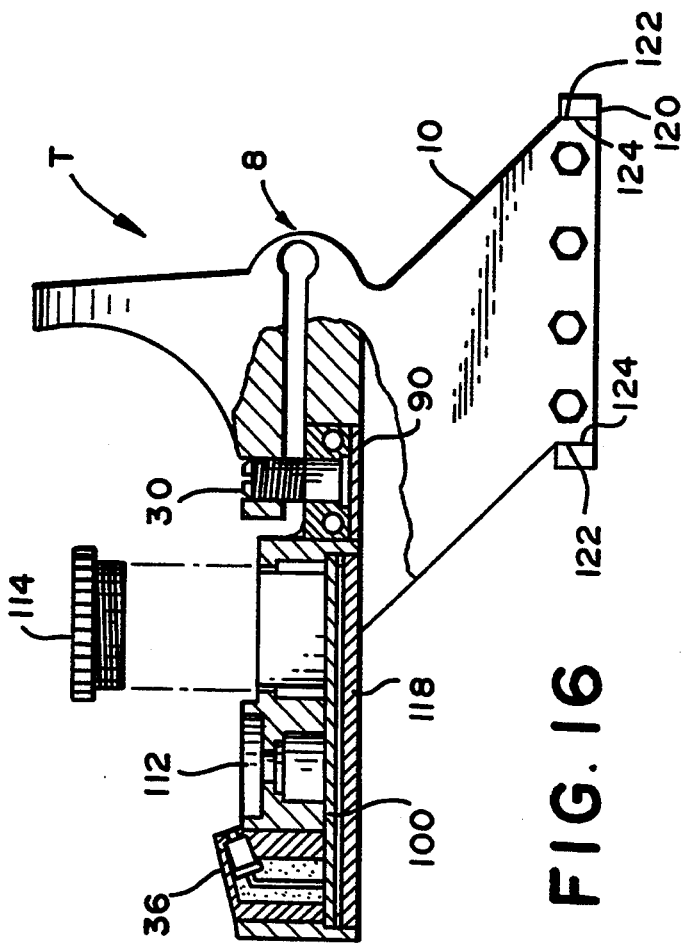
FIG. 16 is a side elevational view of FIG. 15 with portions shown in cross-section.

Another embodiment of a gunsight T is disclosed in FIGS. 15, 16 and 17. The gunsight T has a switch/rheostat 112 to control the operation of the photodiode assembly 36. The rheostat advantageously provides a means for varying the voltage across the photodiode assembly 36 thereby to vary its light output. A screw-on battery cover 114 advantageously provides a convenient means of access to the battery.

The dovetail retainer 90 for securing the height adjustment screw 30 is advantageously disposed in a dovetail slot disposed such that it is held captive by the opposing walls of the slot 72, as best shown in FIGS. 16 and 17. A cover 118 advantageously protects the circuit board 100 from dirt and other contamination.

Figure 18:
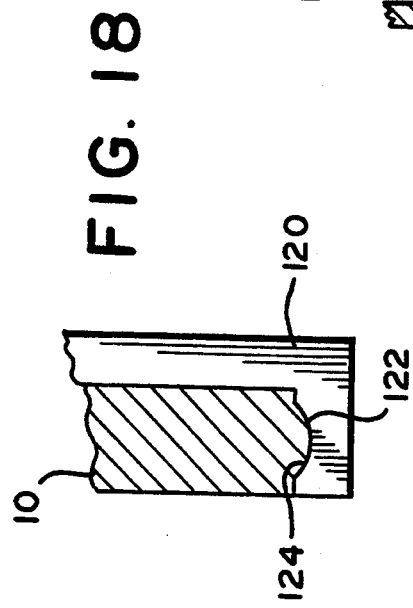
FIG. 18 is a fragmentary, enlarged cross-sectional view taken along line 18—18 in FIG. 17, showing a shim removably secured to a leg portion of the gunsight.

The gunsight T is disclosed with clip-on shims 120 to advantageously permit the gunsight to fit a wide range of firearms. The shim 120 is secured to respective leg portions 10 and 12 by means of a ridge 122 and cooperating recess 124, as best shown in FIGS. 16 and 18. Referring to FIG. 19, the shim 120 advantageously permits the leg portions 10 and 12 to straddle the gun frame 126 and allow interference-free movement for the gun slide 128. Screw 130 secures the gunsight to the gun frame 126.

The operation of the gunsights S and T is similar to the operation of the gunsight R. Height adjustments are provided by the height adjusting screw 30. After the proper adjustment has been made, the screw 30 is locked in place by the set screw 66 and plug 68. For windage adjustment, the windage screw 74 provides lateral movement for the windage block 70, which then causes the upper arm 6 to twist about the hinge portions 8, thereby shifting the optical axis 34 of the lens 22 about the horizontal. The hinge portions 8 advantageously permit twisting movements of the upper arm 6 above the horizontal and vertical planes. The locking screw 96 or the spring 86 locks the windage adjusting screw 74 to advantageously maintain the adjustment that has been made.

While this invention has been described as having preferred design, it is understood that it is capable of further modification, uses and/or adaptations following in general the principles of the invention and including such departures from the present disclosure as come within known or customary practice in the art to which the invention pertains, and as may be applied to the essential features set forth and fall within the scope of the invention or the limits of the appended claims.

We claim:

1. A gunsight, comprising:
   a) a frame for securing along a longitudinal axis of a gun barrel, said frame having a front end and a rear end;
   b) an open ring secured to said frame front end, said ring being disposed in the open, said ring having a lower portion;
   c) a hinge secured to said frame and said ring lower portion such that said ring is movable about at least one of vertical and horizontal axes relative to said frame;
   d) a lens secured in said ring, said lens having an optical axis disposed at an angle relative to the gun barrel longitudinal axis;
   e) a light source secured to said frame rear end and adapted to project a light spot on said lens; and
   f) said light source and said lens being positioned relative to each other and to the gun barrel longitudinal axis such that the light spot projected onto said lens is reflected to a user's eye who then lines up the light spot onto a target to take aim.

2. A gunsight as in claim 1, wherein:
   a) said frame is integral with said ring.

3. A gunsight as in claim 1, wherein:
   a) said frame is made from plastic.

4. A gunsight as in claim 1, wherein:
   a) said hinge is integral with said frame.

5. A gunsight as in claim 4, wherein:
   a) said hinge is integral with said ring.

6. A gunsight as in claim 1, wherein:
   a) said hinge is movable about horizontal and vertical axes relative to said frame.

7. A gunsight as in claim 1, and further comprising:
   a) a switch connected to said light source.

8. A gunsight as in claim 7, wherein:
   a) said switch includes a photocell.

9. A gunsight as in claim 8, wherein:
   a) said photocell has an internal resistance which varies inversely with the intensity of light impinging on said photocell; and
   b) said photocell is connected in series with a battery and said light source whereby the output of said light source increases as intensity of light impinging on said photocell increases, and the output decreases as the light impinging on said photocell decreases.

10. A gunsight as in claim 7, wherein:
    a) said switch includes a rheostat.

11. A gunsight as in claim 1, and further comprising:
    a) a carriage carrying said light source for moving said light source substantially transversely of the gun barrel longitudinal axis.

12. A gunsight, comprising:
    a) a unitary frame including an upper portion and a base portion for securing along a longitudinal axis of a gun barrel, said base portion having front and rear ends;
    b) said upper portion being disposed at said base portion front end;
    c) an integral resilient portion disposed between said base portion and said upper portion such that said upper portion is hingedly movable about at least one of vertical and horizontal axes relative to said base portion;
    d) said upper portion including an integral holder;
    e) a lens secured in said holder, said lens having an optical axis disposed at an angle relative to the gun barrel longitudinal axis;
    f) a light source secured to said base portion rear end and adapted to project a light spot onto said lens; and
    g) said light source and said lens being positioned relative to each other and to the gun barrel longitudinal axis such that the light spot projected onto said lens is reflected to a user's eye who then lines up the light spot onto a target to take aim.

13. A gunsight as in claim 12, wherein:
a) said holder is a ring and said upper portion includes a leg portion disposed substantially transversely to said ring.

14. A gunsight as in claim 13, wherein:
a) said leg portion includes a front portion secured to said resilient portion and a rear portion selectively movable about said resilient portion.

15. A gunsight as in claim 14, and further comprising:
a) a slide disposed within a slot in said frame, said slide being selectively movable laterally of said slot; and
b) said slide is connected to said leg portion rear portion such that movement of said slide causes said holder to move about said resilient portion.

16. A gunsight as in claim 15, and further comprising:
a) a lock to secure said slide after being moved.

17. A gunsight as in claim 15, and further comprising:
a) a windage screw operably secured to said slide and said frame for selectively positioning said slide in said slot; and
b) a clamp for securing said windage screw in the selected position.

18. A gunsight as in claim 17, wherein:
a) said windage screw has a conical head; and
b) a locking screw having a complementary conical head in contact with said windage screw conical head.

19. A gunsight as in claim 17, wherein:
a) said windage screw has longitudinal notches disposed circumferentially around its head; and
b) said clamp is a spring biased in any one of said notches.

20. A gunsight as in claim 12, wherein:
a) said base portion includes a battery holder.

21. A gunsight as in claim 20, wherein:
a) said base portion includes a recess; and
b) said battery holder is disposed in said recess.

22. A gunsight as in claim 12, and further comprising:
a) a switch connected to said light source.

23. A gunsight as in claim 22, wherein:
a) said switch includes a rheostat.

24. A gunsight as in claim 12, wherein:
a) said light source is a light emitting diode.

25. A gunsight, as in claim 12, wherein:
a) said frame includes a cavity;
b) a battery and a switch operably connected to said light source; and
c) a circuit board disposed within said cavity and operably connected to said light source, battery and switch.

26. A gunsight, comprising:
a) a unitary frame including an upper arm portion and a base portion for securing along a longitudinal axis of a gun barrel, said base portion having front and rear ends;
b) said upper arm portion being disposed at said base portion front end;
c) a resilient portion disposed between said base and upper arm portions such that said upper arm portion is hingedly movable relative to said base portion about said resilient portion;
d) said upper arm portion including a holder;
e) a lens secured in said holder, said lens having an optical axis disposed at an angle relative to the gun barrel longitudinal axis;
f) a light source secured to said base portion rear end and adapted to project a light spot onto said lens;
g) said light source and said lens being positioned relative to each other and to the gun barrel longitudinal axis such that the light spot projected onto said lens is reflected to a user's eye who then lines up the light spot onto a target to take aim; and
h) said upper arm portion including a front portion secured to siad resilient portion and a rear portion selectively movable about said resilient portion thereby to selectively position said holder and said lens relative to said light source.

27. A gunsight, comprising:
a) a frame for securing along a longitudinal axis of a gun barrel, said frame having front and rear ends;
b) a lens holder disposed at said frame front end;
c) a hinge disposed between said frame and said lens holder such that said lens holder is hingedly movable relative to said frame;
d) a lens secured in said lens holder, said lens having an optical axis disposed at an angle relative to the gun barrel longitudinal axis;
e) a light source secured to said frame rear end and adapted to project a light spot onto said lens;
f) said light source and said lens being positioned relative to each other and to the gun barrel longitudinal axis such that the light spot projected onto said lens is reflected to a user's eye who then lines up the light spot onto a target to take aim;
g) said lens holder including a front portion secured to said hinge and a rear portion selectively movable about said hinge thereby to selectively position said lens holder and said lens relative to said light source;
h) a slide disposed within a slot in said frame, said slide being selectively movable laterally of said slot; and
i) said slide is connected to said lens holder rear portion such that movement of said slide causes said lens holder to move about said hinge.

28. A gunsight as in claim 27, and further comprising:
a) a lock to secure said slide after being moved.

29. A gunsight as in claim 27, wherein:
a) said light source includes a photodiode, a battery and a switch; and
b) said photodiode, battery and switch are connected in series and disposed in a recess in said frame.

30. A gunsight as in claim 27, and further comprising:
a) a captive screw carried by said slide and threadedly secured to said lens holder such that said lens holder is moved about said hinge when said screw is turned.

31. A gunsight as in claim 27, and further comprising:
a) a windage screw operably secured to said slide and said frame for selectively positioning said slide in said slot; and
b) a clamp for securing said windage screw in the selected position.

32. A gunsight as in claim 31, wherein:
a) said windage screw has a conical head; and
b) a locking screw having a complementary conical head in contact with said windage screw conical head.

33. A gunsight as in claim 31, wherein:
a) said windage screw has longitudinal notches disposed circumferentially around its head; and
b) said clamp is a spring biased in any one of said notches.

34. A gunsight as in claim 31, wherein:
a) said frame includes first and second opposed leg portions; and
b) shims removably secured to said leg portions.

* * * * *